United States Patent
Yamakawa et al.

(10) Patent No.: US 10,446,096 B2
(45) Date of Patent: Oct. 15, 2019

(54) IMAGE GENERATION DEVICE AND HEAD-UP DISPLAY

(71) Applicant: NIPPON SEIKI CO., LTD., Niigata (JP)

(72) Inventors: Yasuhiro Yamakawa, Niigata (JP); Takashi Nakamura, Niigata (JP)

(73) Assignee: NIPPON SEIKI CO., LTD., Niigata (JP)

( * ) Notice: Subject to any disclaimer, the term of this patent is extended or adjusted under 35 U.S.C. 154(b) by 86 days.

(21) Appl. No.: 15/739,936

(22) PCT Filed: Jul. 4, 2016

(86) PCT No.: PCT/JP2016/069732
§ 371 (c)(1),
(2) Date: Dec. 26, 2017

(87) PCT Pub. No.: WO2017/006885
PCT Pub. Date: Jan. 12, 2017

(65) Prior Publication Data
US 2018/0197493 A1 Jul. 12, 2018

(30) Foreign Application Priority Data
Jul. 7, 2015 (JP) ................................. 2015-135887

(51) Int. Cl.
*G09G 3/36* (2006.01)
*B60K 35/00* (2006.01)
(Continued)

(52) U.S. Cl.
CPC .......... *G09G 3/3607* (2013.01); *B60K 35/00* (2013.01); *G02B 26/101* (2013.01);
(Continued)

(58) Field of Classification Search
CPC .......... G09G 3/3406; G09G 2320/064; G09G 2340/06; G09G 2360/16; H04N 9/3129; H04N 9/3167
See application file for complete search history.

(56) References Cited

U.S. PATENT DOCUMENTS

2008/0094616 A1* 4/2008 Tanaka ............... G01N 21/8803
356/237.2
2009/0224136 A1* 9/2009 Ikegami .................... G01J 1/32
250/205
(Continued)

FOREIGN PATENT DOCUMENTS

JP 2013-015738 A 1/2013
JP 2013-130832 A 7/2013
(Continued)

OTHER PUBLICATIONS

International Search Report issued in corresponding International Application No. PCT/JP2016/069732, dated Sep. 13, 2016.

*Primary Examiner* — Kevin M Nguyen
(74) *Attorney, Agent, or Firm* — McDermott Will & Emery LLP (57) ABSTRACT

Aspects of the subject technology relate to an image generation device that generates an image with good white balance while preventing burn-in of a liquid crystal element, and a head-up display. A light adjustment unit includes a liquid crystal element for adjusting a polarization angle of laser light, and adjusts the polarization angle of the laser light in order to adjust the intensity of laser light that is oriented in an emission direction. A light detection unit detects the light intensity of the laser light (reflected light) that has passed through the light adjustment unit. A control unit corrects outputs of a plurality of light sources based on the light intensity of the laser light (reflected light) detected by the light detection unit at a timing different from a timing
(Continued)

at which a voltage applied to the liquid crystal element is reversed.

20 Claims, 7 Drawing Sheets

(51) Int. Cl.
    *G02B 27/01*     (2006.01)
    *G09G 3/34*     (2006.01)
    *G02B 27/28*     (2006.01)
    *G02B 27/48*     (2006.01)
    *G09G 3/00*     (2006.01)
    *G09G 3/02*     (2006.01)
    *H04N 9/31*     (2006.01)
    *G02B 26/10*     (2006.01)

(52) U.S. Cl.
    CPC ....... *G02B 27/0101* (2013.01); *G02B 27/281* (2013.01); *G02B 27/286* (2013.01); *G02B 27/48* (2013.01); *G09G 3/002* (2013.01); *G09G 3/025* (2013.01); *G09G 3/342* (2013.01); *G09G 3/3413* (2013.01); *H04N 9/3129* (2013.01); *H04N 9/3182* (2013.01); *H04N 9/3194* (2013.01); *B60K 2370/1529* (2019.05); *B60K 2370/52* (2019.05); *G02B 2027/012* (2013.01); *G02B 2027/0112* (2013.01); *G02B 2027/0118* (2013.01); *G09G 2320/041* (2013.01); *G09G 2320/046* (2013.01); *G09G 2320/0666* (2013.01); *G09G 2360/144* (2013.01); *G09G 2380/10* (2013.01)

(56) References Cited

U.S. PATENT DOCUMENTS

| | | | |
|---|---|---|---|
| 2009/0244407 | A1* | 10/2009 | Sakakibara .......... H04N 9/3194 348/759 |
| 2011/0228375 | A1* | 9/2011 | Desai .................. G02F 1/05 359/245 |
| 2014/0152711 | A1 | 6/2014 | Sekiya et al. |
| 2015/0260984 | A1 | 9/2015 | Yamakawa et al. |

FOREIGN PATENT DOCUMENTS

| | | |
|---|---|---|
| JP | 2014-074818 A | 4/2014 |
| JP | 2014-086426 A | 5/2014 |

\* cited by examiner

| 11a | | 12a | | 13a | |
|---|---|---|---|---|---|
| 11b | LIGHT SOURCE 11 | 12b | CONDENSING UNIT 12 | 13b | LIGHT COMPOSING UNIT 13 |
| 11c | | 12c | | 13c | |

IMAGE GENERATION DEVICE AND HEAD-UP DISPLAY

CROSS REFERENCE

This application is the U.S. National Phase under 35 U.S.C. § 371 of International Application No. PCT/JP2016/069732, filed on Jul. 4, 2016, which claims the benefit of Japanese Application No. 2015-135887, filed on Jul. 7, 2015, the entire contents of each are hereby incorporated by reference.

TECHNICAL FIELD

The present invention relates to an image generation device that generates an image by performing spatial light modulation of a laser light beam and a head-up display that displays an image generated by the image generation device as a virtual image.

BACKGROUND ART

An image generation device is applied to, for example, the head-up display device disclosed in PTL 1 and this image generation device includes a light source that emits a laser light beam, a scanning unit that generates an image by scanning the laser light beam from the light source, and a light adjustment unit that is disposed in the light path of the laser light beam between the light source and the scanning unit, includes a liquid crystal element for controlling the polarization angle of the laser light beam, and adjusts the light intensity of the laser light beam toward the scanning unit. The image generation device obtains the dynamic range of the brightness of an image by attenuating the light intensity of a laser light beam using the light adjustment unit.

In addition, in the liquid crystal element disclosed in PTL 1, the positive electrode and the negative electrode are applied alternately at intervals of the frame cycle as an applied voltage to the liquid crystal element to prevent burn-in.

By the way, in an image generation device to be applied to a head-up display or the like installed in a vehicle or the like, the ambient temperature is apt to change and the difference in the temperature is large. Since the output characteristic of a semiconductor laser light source emitting a laser light beam changes when the ambient environment temperature changes, even if the light source is driven similarly, a laser light beam having a desired light intensity cannot be output.

To address such a problem, the image generation device (laser scanning display device) disclosed in PTL 2 causes the light source to output a laser light beam having a desired light intensity by detecting the light intensity of the laser light beam using a light detection unit and continuously or intermittently correcting the driving of the light source based on the light intensity signal detected by the light detection unit.

CITATION LIST

Patent Literature

PTL 1: JP-A-2013-015738
PTL 2: JP-A-2014-086426

SUMMARY OF INVENTION

Technical Problem

However, when the timing at which the polarity is switched between the positive electrode and the negative electrode of a liquid crystal element overlaps with the timing at which the light intensity is detected to correct the output power of the light source, error is introduced in the detection of the light intensity, the light source cannot be corrected appropriately, and the image generation device cannot generate an image with desired brightness and a desired color, so there is room for improvement.

Accordingly, an object of the invention is to provide an image generation device and a head-up display that can generate an image with good white balance while preventing burn-in of a liquid crystal element.

Solution to Problem

The invention adopts the following means to solve the above problems.

That is, an image generation device according to the first aspect of the invention includes a plurality of light sources capable of emitting laser light beams of different colors, a light adjustment unit having a liquid crystal element receiving the laser light beams from the light sources and adjusting polarization angles of the laser light beams, the light adjustment unit adjusting the laser light beams by adjusting the polarization angles of the laser light beams, a light adjustment control unit for adjusting the laser light beams by controlling the liquid crystal element, the light adjustment control unit reversing a voltage applied to the liquid crystal element to a positive electrode or a negative electrode, a scanning unit for generating an image by scanning the laser light beams having passed through the light adjustment unit in a secondary scanning direction orthogonal to a primary scanning direction while scanning the laser light beams a plurality of times in the primary scanning direction, a light detection unit for detecting light intensities of the laser light beams having passed through the light adjustment unit, and a light source correction unit for correcting outputs of the plurality of light sources based on light intensities of the laser light beams of different colors detected by the light detection unit at a timing different from a timing at which the voltage applied to the liquid crystal element is reversed by the light adjustment control unit.

In addition, a head-up display according to the second aspect includes the image generation device, a relay optical system for projecting the image generated by the image generation device to a transmission reflection unit, and an external light sensor for detecting external illuminance, in which the light adjustment control unit adjusts the laser light beams at a timing excluding a period from when the light source correction unit inputs the light intensities of the laser light beams to when the light adjustment control unit corrects output power of the plurality of light sources.

Advantageous Effects of Invention

The invention can generate an image with good white balance while preventing burn-in of a liquid crystal element.

BRIEF DESCRIPTION OF DRAWINGS

FIG. 5(a) illustrates the temporal transition of a secondary scanning position, and FIG. 5(b) illustrates the temporal transition of a primary scanning position.

FIG. 10(a) illustrates the transition of a secondary scanning position of the scanning unit, FIG. 10(b) illustrates the timing at which inspection light is emitted from a light source, and FIG. 10(c) illustrates the timing of a switchover between the positive electrode and negative electrode of the liquid crystal element.

FIG. 11(a) illustrates the transition of a secondary scanning position of the scanning unit, FIG. 11(b) illustrates the timing at which inspection light is emitted from a light source, and FIG. 11(c) illustrates the timing of a switchover between the positive electrode and negative electrode of the liquid crystal element.

FIG. 12(a) illustrates the transition of a secondary scanning position of the scanning unit, FIG. 12(b) illustrates the timing at which inspection light is emitted from a light source, and FIG. 12(c) illustrates the timing of a switchover between the positive electrode and negative electrode of the liquid crystal element.

DESCRIPTION OF EMBODIMENTS

The following describes an embodiment in which an image generation device according to the invention is applied to a head-up display (referred to below as an HUD) installed in a vehicle with reference to the attached drawings.

Figure 1:
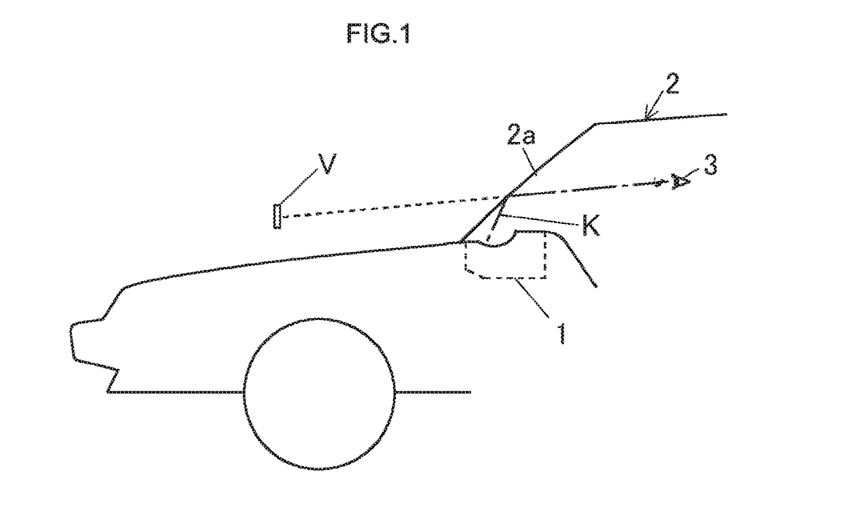
FIG. 1 illustrates a form of installing a head-up display according to an embodiment of the invention.

A HUD 1 according to the embodiment of the invention is disposed in the dashboard of a vehicle 2 as illustrated in FIG. 1, and emits display light K representing an image M (see FIG. 2) reporting predetermined information toward a windshield (a part of the transmission reflection unit) 2a. The display light K reflected by the front windshield 2a is visually recognized by an observer 3 (mainly the driver of the vehicle 2) as a virtual image V formed in front of the front windshield 2a. In this way, the HUD 1 causes the observer 3 to visually recognize the virtual image V.

Figure 2:
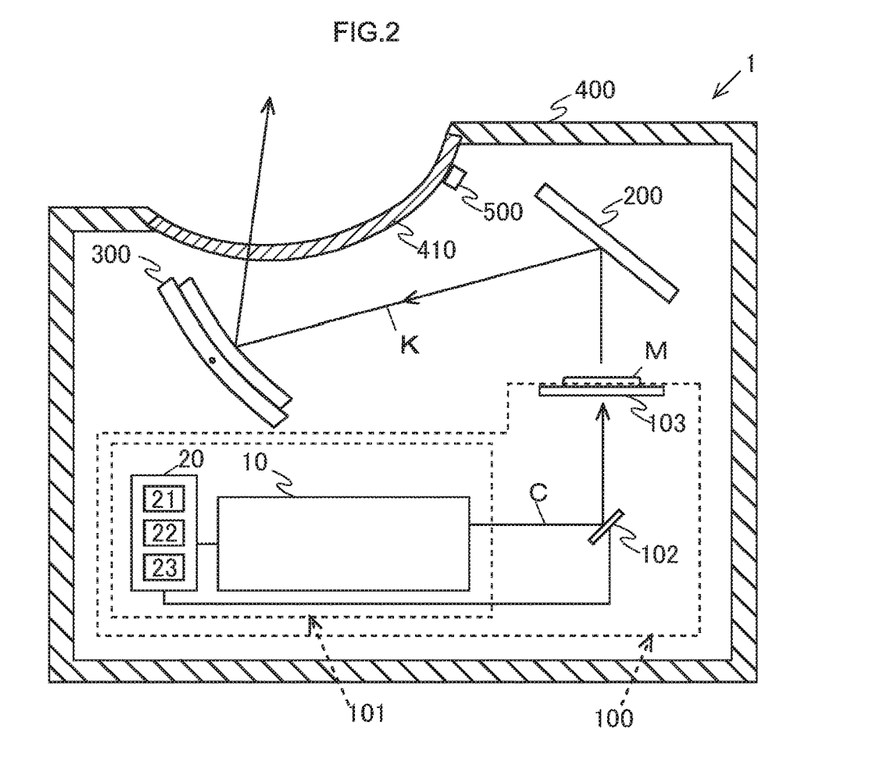
FIG. 2 illustrates an example of a schematic cross section of the head-up display according to the embodiment.

As illustrated in FIG. 2, the HUD 1 in FIG. 1 includes an image generation unit (image generation device) 100 for generating the image M, a first reflection unit 200 and a second reflection unit 300, which are relay optical systems for directing the display light K of the image M generated by the image generation unit 100 toward the front windshield 2a, the cabinet 400 in which the image generation unit 100, the first reflection unit 200, the second reflection unit 300, and the like are housed, and an external light sensor 500 for detecting the external illuminance of the HUD 1.

The first reflection unit (relay optical system) 200 and the second reflection unit (relay optical system) 300 in FIG. 2 are configured by, for example, planar or curved mirrors or the like. The first reflection unit 200 and the second reflection unit 300 receive the display light K representing the image M displayed on a screen 103 and reflects the display light K toward the front windshield 2a. The second reflection unit 300 provided with a curved concave surface typically has the function of enlarging the image M generated by the image generation unit 100, the function of correcting the distortion of the front windshield 2a and causing the observer 3 to visually recognize the virtual image V without distortion, the function of forming the virtual image V at the position away from the user by a predetermined distance, and the like. In addition, although two reflective relay optical systems, which are the first reflection unit 200 and the second reflection unit 300, are illustrated in FIG. 2, for example, one (second reflection unit 300) of the reflective relay optical systems may be omitted or another reflective relay optical system may be added. In addition, it is also possible to use not only a reflective relay optical system, but also a translucent relay optical system such as a lens as the relay optical system.

The cabinet 400 in FIG. 2, which is made of a lightproof member, houses a laser light source unit 101, a scanning unit 102, the screen 103, the first reflection unit 200, the second reflection unit 300, and the like and has, as a part, a light transmission part 410 through which the display light K transmits. In addition, the external light sensor 500 is provided, for example, on the inner surface of the light transmission part 410 and the external light sensor 500 detects the external illuminance of the HUD 1 and outputs information about the external illuminance to a control unit 20, which will be described later.

(Image Generation Unit (Image Generation Device) 100)

The image generation unit 100 in FIG. 2 generates the image M on a display surface (screen 103) by scanning a laser light beam two-dimensionally. The image generation unit 100 mainly includes the laser light source unit (laser light source device) 101 for emitting, for example, a combined laser light beam C, the scanning unit 102 for scanning the combined laser light beam C emitted by the laser light source unit 101, and the screen 103 for receiving the combined laser light beam C scanned by the scanning unit 102 and displaying the image M.

(Laser Light Source Unit (Laser Light Source Device) 101)

The laser light source unit 101 emits the combined laser light beam C, which will be described later, toward the scanning unit 102 and includes, for example, the combined laser light source unit 10 and control unit 20 for controlling a light source 11, a light adjustment unit 14, and the like in the combined laser light source unit 10, which will be described later.

Figure 3:
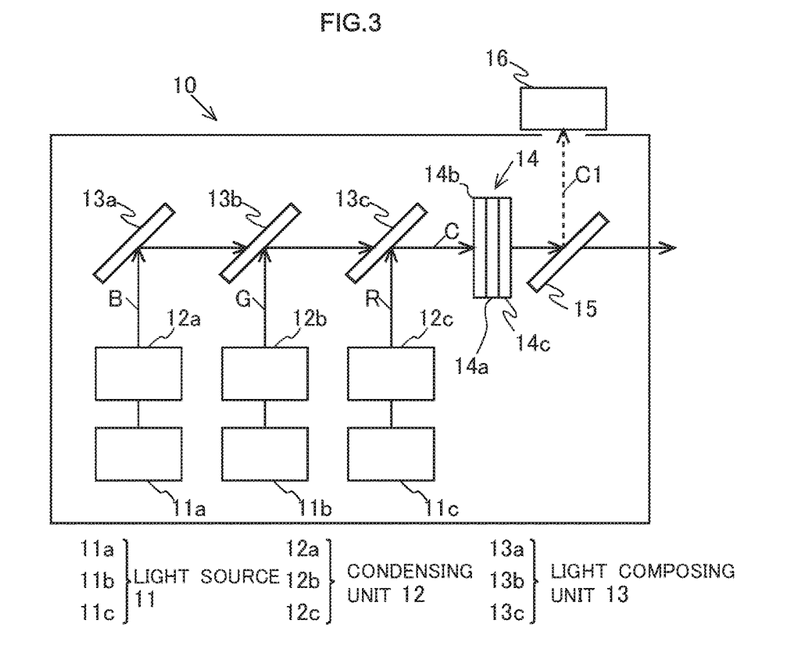
FIG. 3 illustrates an example of a schematic cross section of a laser light source unit according to the embodiment.

FIG. 3 illustrates an example of the structure of the laser light source unit 10 and the laser light source unit 101 mainly includes the light source 11, a condensing unit 12, a light composing unit 13, the light adjustment unit 14, a light branching unit 15, and a light detection unit 16 as illustrated in FIG. 3.

The light source 11 in FIG. 3 has a plurality of light sources for emitting color light beams of different colors and includes, for example, a first light source 11*a* for emitting a blue laser light beam B, a second light source 11*b* for emitting a green laser light beam G, a third light source 11*c* for emitting a red laser light beam R. Specifically, the light source 11 can output, for example, a 256-tone light intensity for each color and controls the tones of the light sources 11*a*, 11*b*, and 11*c* so that the laser light beams having desired intensities are emitted, based on light source control data stored in the control unit 20 described later.

The condensing unit 12 in FIG. 3 condenses the laser light beams B, G, and R emitted from the light sources 11*a*, 11*b*, and 11*c* and reduces the spot diameters to generate a convergent light beam. The condensing unit 12 includes, for example, a first condensing unit 12*a*, a second condensing unit 12*b*, and a third condensing unit 12*c*. The first condensing unit 12*a* is located in the light path of the blue laser light beam B emitted from the first light source 11*a* and condenses the blue laser light beam B. The second condensing unit 12*b* is located in the light path of the green laser light beam G emitted from the second light source 11*b* and condenses the green laser light beam G. The third condensing unit 12*c* is located in the light path of the red laser light beam R emitted from the third light source 11*c* and condenses the red laser light beam R.

The light composing unit 13 in FIG. 3 aligns the optical axes of the laser light beams B, G, and R that were emitted from the light sources 11*a*, 11*b*, and 11*c* and reached the light composing unit 13 via the condensing unit 12 and outputs them as the combined laser light beam C and has the first light composing unit 13*a* for adjusting the optical axis of the blue laser light beam B, the second light composing unit 13*b* for adjusting the optical axis of the green laser light beam G, and the third light composing unit 13*c* for adjusting the optical axis of the red laser light beam R.

The light adjustment unit 14 in FIG. 3 includes, for example, a VA (Vertial Alignment) liquid crystal element 14*a* and two reflective or absorptive polarizing filters 14*b* and 14*c* clamping the liquid crystal element 14*a* therebetween, changes the light transmission ratio of the combined laser light beam C passing through the light adjustment unit 14 by driving the liquid crystal element 14*a* with the pulse amplitude modulation (PAM) system or the pulse width modulation (PWM) system based on the light adjustment value set by the control unit 20, which will be described later, and adjusts (luminance-adjust) the combined laser light beam C having been input to the light adjustment unit 14 to a desired light intensity. It should be noted that the light adjustment unit 14 may be disposed in each of the light paths of the laser light beam R, the laser light beam G, and the laser light beam B before being combined by the light composing unit 13, instead of the position in which the combined laser light beam C (obtained by combining the laser light beam R, the laser light beam G, and the laser light beam B) is received. In addition, the light adjustment unit 14 may be configured by a reflective LCoS (Liquid Crystal On Silicon) or the like instead of a translucent liquid crystal element. The light adjustment unit 14 sets the light adjustment value based on the external illuminance detected by the external light sensor 500, which will be described later, under control of the control unit 20, which will be described later. Specifically, for example, when the external illuminance is high (bright), the light adjustment value of the light adjustment unit 14 is set to a high value in order to display the image M with high brightness. When the external illuminance is low (dark), the light adjustment value of the light adjustment unit 14 is set to a low value in order to display the image M with low brightness. In addition, the light adjustment unit 14 is preferably driven so that the positive electrode and the negative electrode having the same voltage are applied for the same application period to prevent burn-in of the liquid crystal element. In addition, the liquid crystal element 14*a* and the two polarizing filters 14*b* and 14*c* of the light adjustment unit 14 may be provided separately from each other or provided successively in the light path of the combined laser light beam C as illustrated in FIG. 3. It should be noted that the polarizing filter 14*b* closer to the light source 11 than the liquid crystal element 14*a* may be omitted.

The light branching unit 15 in FIG. 3 is made of, for example, a translucent member having a reflectivity of approximately 5% and disposed in the optical path of the combined laser light beam C from the light adjustment unit 14 to the scanning unit 102. Although most of the combined laser light beam C from the light adjustment unit 14 transmits through the combined laser light beam C as is, a part of the light beam is reflected as reflected light beam C1 toward the light detection unit 16, which will be described later.

The light detection unit 16 in FIG. 3 includes, for example, a photodiode, a color sensor, or the like and receives the reflected light beam C1 reflected by the light branching unit 15 and detects the light intensities of the laser light beams B, G, and R of the received reflected light beam C1. The light detection unit 16 outputs, to the control unit 20 described later, detection signals according to the light intensities of the laser light beams B, G, and R of the received reflected light beam C1.

The control unit 20 in FIG. 2 mainly includes a processing unit 21 having, for example, one or a plurality of microcomputers, an FPGA, and the like, a storage unit 22 having one or a plurality of ROMs, an input unit 23 that is an interface receiving a signal from the outside, and a driving circuit (not illustrated) for driving the light source 11, the light adjustment unit 14, the scanning unit 102, and the like and mounted on a printed circuit board (not illustrated) disposed inside the cabinet 400. It should be noted that the control unit 20 may be disposed outside the cabinet 400 and may be electrically connected to the inside of the HUD 1 via wiring. In addition, all functions of the control unit 20 may be provided on a single printed circuit board or may be divided into a plurality of printed circuit boards. It should be noted that the processing unit 21 (control unit 20) according to the embodiment also has the function of the light adjustment control unit that controls the liquid crystal element 14*a* according to the invention and reverses a voltage applied to the liquid crystal element 14*a* to the positive electrode or the negative electrode and the function of light source correction unit that corrects the outputs of the plurality of the light sources 11*a*, 11*b*, and 11*c*. Details on the working and the like of the control unit 20 will be described later.

Figure 4:
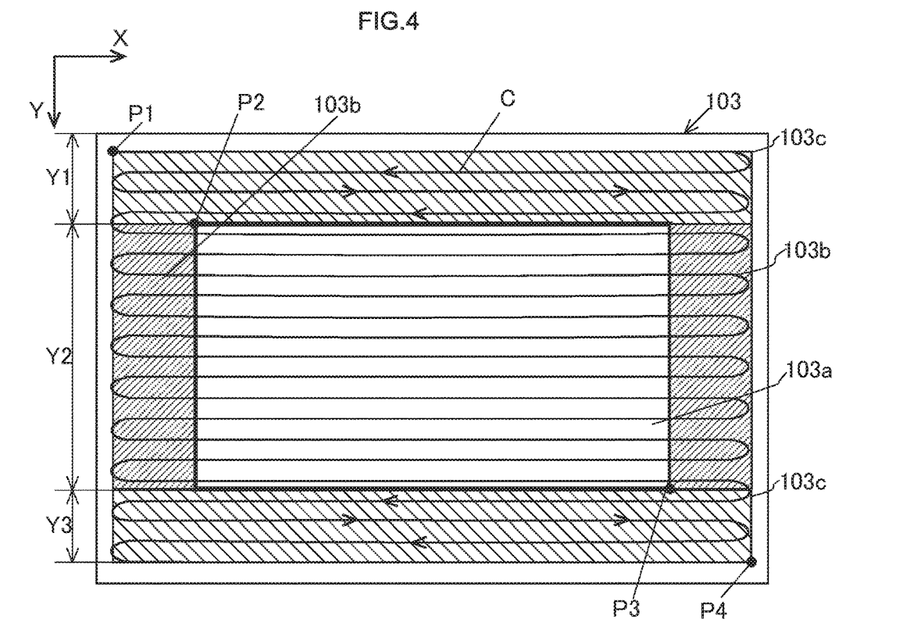
FIG. 4 illustrates an example of a form of scanning a screen of an image generation device according to the embodiment.

FIG. 4 illustrates an example of a form of in which the scanning unit 102 in FIG. 2 scans the combined laser light beam C on the screen 103.

The scanning unit 102 receives the combined laser light beam C from the laser light source unit 10, scans the received combined laser light beam C on the screen 103 in the secondary scanning direction Y while scanning in the primary scanning direction X a plurality of times as illustrated in FIG. 4 under control of a control unit 20, which will be described later, and displays the desired image M on the screen 103.

The screen 103 includes, for example, a holographic diffuser, a microlens array, a diffusion plate, and the like and receives the combined laser light beam C scanned by the scanning unit 102 on the back surface, displays the image M on the front surface, and emits the display light K representing the image M from the surface toward the first reflection unit 200 (relay optical system).

The screen 103 is divided into an effective display area 103a and non-display areas (103b and 103c). The effective display area 103a is smaller than the outline of the screen 103 indicated by the bold frame in FIG. 4 and can be visually recognized by the observer 3 as the virtual image V (that is, the region reflected by the first reflection unit 200 or the like and output to the outside as the display light K). The non-display areas (103b and 103c) are shaded regions that surround the effective display area 103a and the areas are not visually recognized by the observer 3 generally. The non-display areas are disposed near the loopback positions of primary scanning during primary scanning of the effective display area 103a and divided into the intermittent non-display areas 103b (the regions to the left and to the right of the effective display area 103a in FIG. 4) to which the effective display area 103a switches intermittently during primary scanning and the continuous non-display areas 103c (the regions above and below the effective display area 103a in FIG. 4) outside the effective display area 103a continuously scanned during secondary scanning.

Figure 5:
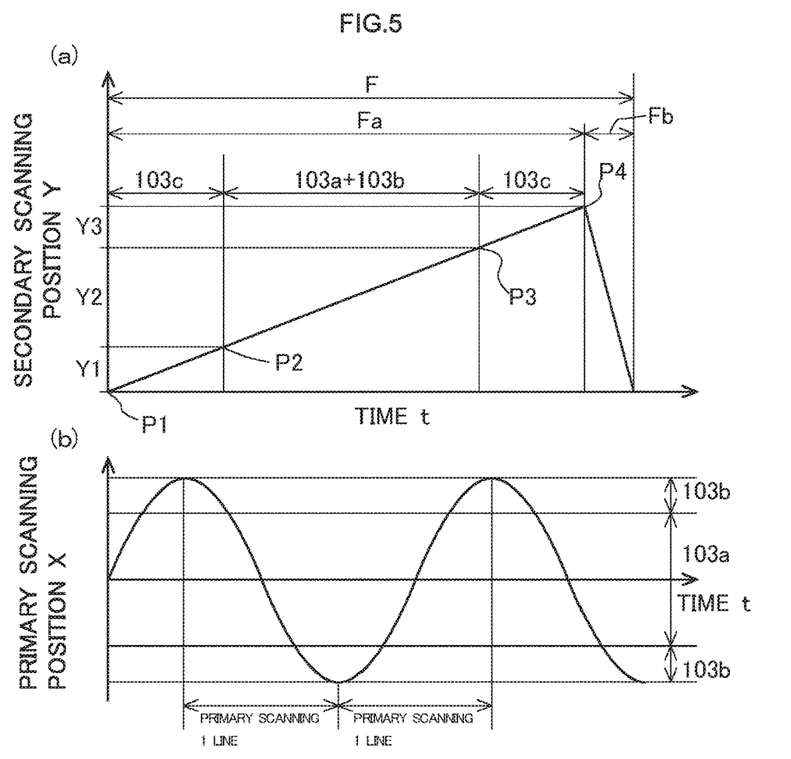
FIG. 5 illustrates the temporal transition of a scanning position by a scanning unit according to the embodiment.

As illustrated in FIG. 4, the scanning unit 102 scans the combined laser light beam C from a scan start position P1 to a scan end position P4 of the screen 103 (see the solid line indicated by symbol C), returns to the scan start position P1 again when reaching the scan end position P4, and scans the combined laser light beam C again. The scanning period of the scanning unit 102 is divided into an actual scanning period Fa for which the effective display area 103a and the non-display areas (103b and 103c) are scanned and a retrace period Fb for returning from the scan end position P4 to the scan start position P1 in a frame period F in which the image M is formed, as illustrated in FIG. 5(a). In the frame period F, the scanning unit 102 starts scanning when the scanning position is at the scan start position P1, passes through a display start position P2 and a display end position P3 between which the effective display area 103a is scanned, reaches the scan end position P4, and returns to the scan start position P1 again. The frame period F is set to a value less than 1/60 seconds (that is, the frequency equal to or more than 60 Hz, which is the critical fusion frequency below which a person can visually recognize flicker). The structure of the image generation unit 100 according to the embodiment has been described above.

Figure 6:
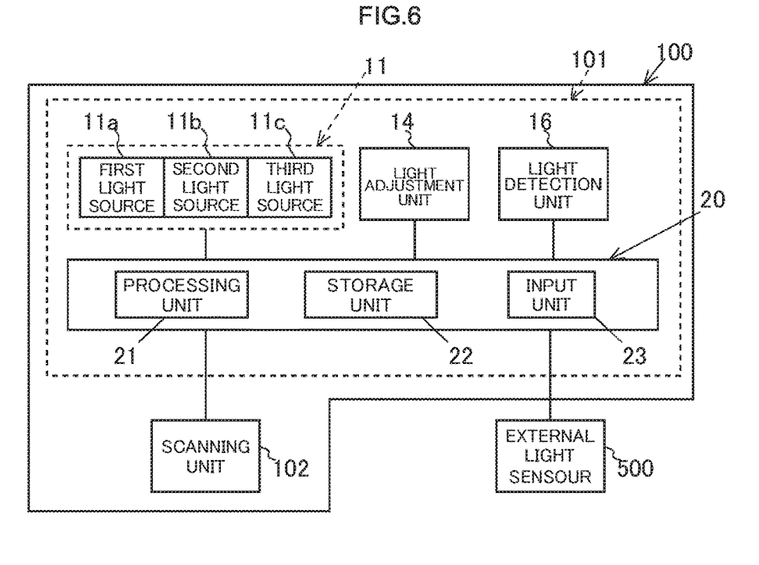
FIG. 6 illustrates an example of the electric structure of the image generation device according to the embodiment.

Next, the electrical structure of the image generation unit 100 illustrated in FIG. 2 will be described with reference to the block diagram in FIG. 6. As illustrated in FIG. 6, the control unit 20 is electrically connected to the light source 11, the light adjustment unit 14, the light detection unit 16, the scanning unit 102, the external light sensor 500, and the like. The control unit 20 receives, via the input unit 23, vehicle information such as vehicle speed from the vehicle 2, information about the light intensity detected by the light detection unit 16, information about the scanning position output by the scanning unit 102, and information about the external illuminance detected by the external light sensor 500. The processing unit 21 controls the light source 11, the light adjustment unit 14, the scanning unit 102, and the like by reading a program and data from the storage unit 22 based on the information received via the input unit 23 and executing the program.

The processing unit 21 in FIG. 6 can detect or/and estimate the scanning position of the scanning unit 102 and displays the pixels of the image M in desired colors and at desired brightness by controlling the outputs of the light sources 11a, 11b, and 11c in accordance with the scanning position of the scanning unit 102 in order to generate the image M. Specifically, the processing unit 21 can estimate the scanning position of the scanning unit 102 based on, for example, the primary scanning switch data indicating the switch timing of reciprocation in the primary scanning direction X of the scanning unit 102 and the frame switch data indicating the timing of a switchover between frames F input from the scanning unit 102 via the input unit 23.

The storage unit 22 in FIG. 6 stores light source driving data for driving the light sources 11a, 11b, and 11c for emitting the laser light beams of different colors. The light source driving data indicates, for example, the correspondence between the current values for driving the light sources 11a, 11b, and 11c for each of 256 tones (8 bits). However, even when the light source 11 is driven using the same light source control data, it is difficult to represent a desired tone because of changes over time in the characteristics of the light source 11 and the light adjustment unit 14 or changes in the characteristics of the light source 11 and the light adjustment unit 14 caused by the use environment such as temperature. The image generation unit 100 according to the embodiment can represent a desired tone for each of the light sources of the light source 11 that emit light beams of different colors by performing "light intensity correct processing" in which inspection light Cd, which is a laser light beam for inspection, is emitted by the laser light source unit 101, the inspection light Cd is detected by the light detection unit 16, and the light source driving data is corrected based on the light intensity of the laser light beam detected by the light detection unit 16, thereby enabling the image M with good white balance to be displayed. The following describes "display processing" of the image M including "light intensity correct processing" performed by the image generation unit 100 according to the embodiment and "light adjustment processing" for light adjustment of the image M with reference to FIGS. 7 to 10. It should be noted that the image generation device (image generation unit) 100 according to the invention mainly includes the laser light source unit 101, the scanning unit 102, and the screen 103 of the embodiment.

Figure 7:
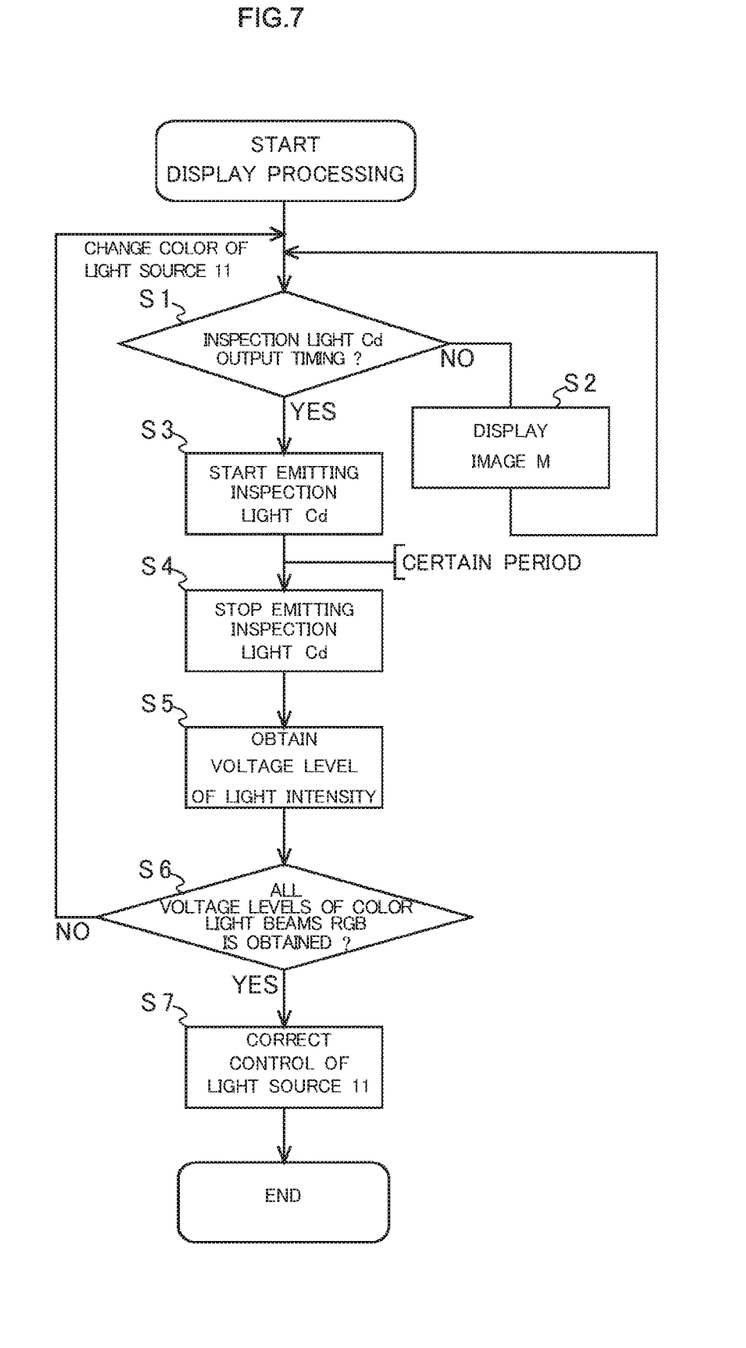
FIG. 7 is a flowchart illustrating an example of display processing performed by the image generation device according to the embodiment.
Figure 8:
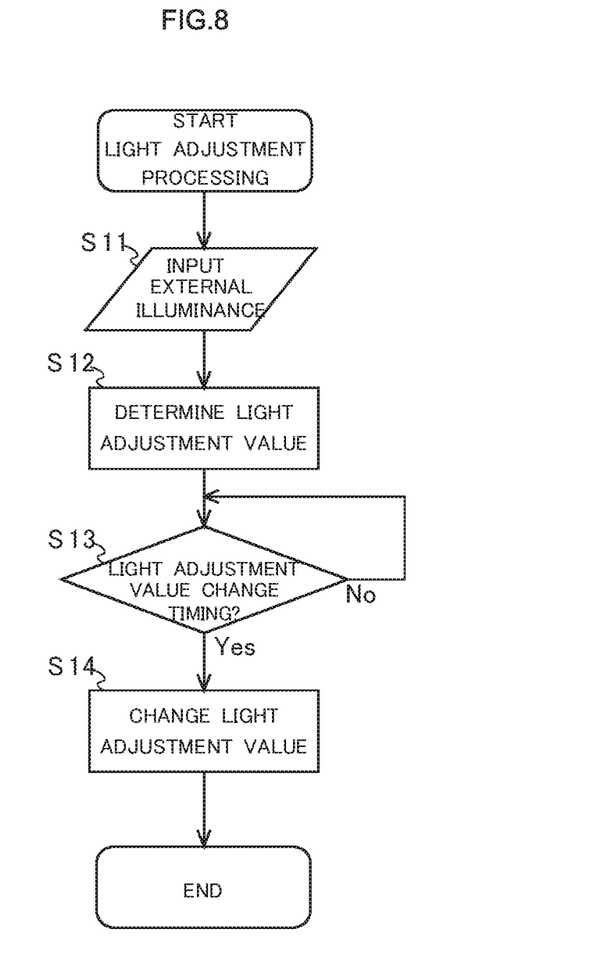
FIG. 8 is a flowchart illustrating an example of light adjustment processing performed by the image generation device according to the embodiment.
Figure 9:
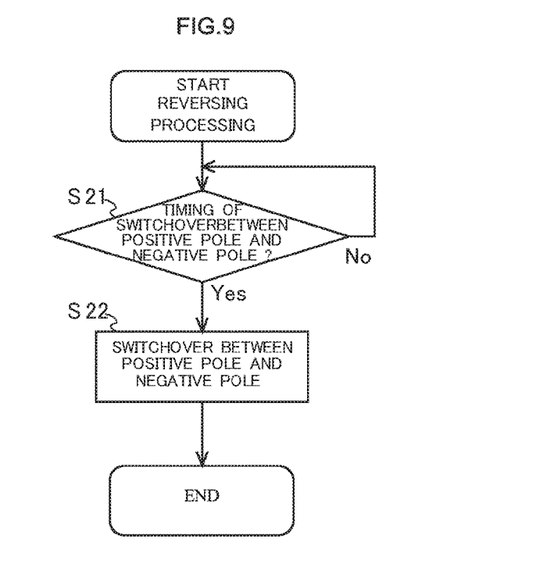
FIG. 9 is a flowchart illustrating an example of reversing processing performed by the image generation device according to the embodiment.

FIG. 7 is a flowchart illustrating "display processing" performed by the image generation unit 100 according to the embodiment, FIG. 8 is a flowchart illustrating "light adjustment processing" performed by the image generation unit 100 according to the embodiment, FIG. 9 is a flowchart illustrating "reversing processing" performed by the image generation unit 100 according to the embodiment, FIG. 10(a) illustrates the temporal transition of the scanning position in the secondary scanning direction Y of the scanning unit 102, FIG. 10(b) illustrates the on-off timing of the inspection light Cd emitted from the light source 11, and FIG. 10(c) illustrates an example of a timing chart illustrating the timing of a switchover between the positive electrode and the negative electrode in the light adjustment unit 14.

First, "display processing" performed by the image generation unit 100 will be described with reference to FIG. 7. It should be noted that steps S3 to S7 in FIG. 7 indicate "light intensity correct processing" described above.

In step S1, the control unit 20 determines whether the scanning position is present in the continuous non-display areas 103c (or in a secondary scanning position Y1 or Y3) in FIG. 4 in which the scanning position does not enter the effective display area 103a continuously even when the scanning unit 102 repeats main scanning. When it is determined that the scanning position of the scanning unit 102 is not present in the continuous non-display areas 103c (or in the secondary scanning position Y1 or Y3) (No in step S1), the control unit 20 proceeds to step S2 and causes the light source 11 to output the combined laser light beam C for generating the image M and generates the image M in the effective display area 103a of the screen 103.

Alternatively, when the control unit 20 determines that the scanning position of the scanning unit 102 is present in the continuous non-display areas 103c (or in the secondary scanning position Y1 or Y3) (YES in step S1), the control unit 20 proceeds to step S3 and causes the light source 11 to emit the inspection light Cd. In step S3, specifically, the control unit 20 causes the light sources 11a, 11b, and 11c to emit the inspection light Cd by driving the light sources 11a, 11b, and 11c with the highest tone at that time. Since the light intensity of the inspection light Cd becomes high by making the tone of the inspection light Cd high, the detection signal from the light detection unit 16, which will be described later, becomes large, the ratio (signal-noise ratio) of noise to the detection signal can be reduced, and the light intensity can be detected accurately. It should be noted that the control unit 20 may have special driving data (other than the light source driving data) for causing the light sources 11a, 11b, and 11c to emit the inspection light Cd. In addition, the processing unit 21 makes adjustment so that the timing at which the inspection light Cd is emitted does not overlap with the timing at which the polarity of the liquid crystal element 14a is reversed. For example, the processing unit 21 makes adjustment so that the inspection light Cd is emitted after the polarity of the liquid crystal element 14a is reversed and then at least 10% or more of the cycle of the liquid crystal element 14a elapses. Specifically, when it takes 10 milliseconds for the polarity of the liquid crystal element 14a to be reversed, the processing unit 21 makes adjustment so that the inspection light Cd is emitted after the polarity of the liquid crystal element 14a is reversed and 1 millisecond or more elapses.

In step S4, the control unit 20 causes the light source 11 to emit the inspection light Cd for a certain period U (see FIG. 10) and stop emitting the inspection light Cd, proceeds to step S5, obtains the voltage level of the detection signal of the inspection light Cd, and stores the voltage level in the storage unit. The control unit 20 according to the embodiment has an integrating circuit (not illustrated) for integrating the inspection signal indicating the light intensity input from the light detection unit 16 and obtains the voltage level of the detection signal integrated by the integrating circuit. It is possible to suppress effects of detection error caused by temporal fluctuations of the detection signal by emitting the inspection light Cd for a certain period and obtaining the voltage level obtained by integrating the detection signal from the light detection unit 16 based on the inspection light Cd for a certain period. In addition, since the obtained voltage level of the detection signal becomes large, the signal-noise ratio can be reduced, and the light intensity can be detected accurately.

By the way, the control unit 20 receives the external illuminance from the external light sensor 500, determines a light adjustment value based on the external illuminance, and controls the light adjustment unit 14. The light intensity of the inspection light Cd received by the light detection unit 16 changes depending on the degree of light adjustment by the light adjustment unit 14. When the external illuminance is high (bright), the light adjustment value by the light adjustment unit 14 is set to a large value to display the image M having high brightness. Accordingly, when the external illuminance is high (bright), the light intensity of the inspection light Cd received by the light detection unit 16 is large. In contrast, when the external illuminance is low (dark), the light adjustment value by the light adjustment unit 14 is set to a small value to display the image M having low brightness. Accordingly, the light intensity of the inspection light Cd received by the light detection unit 16 is small. For example, when the light adjustment value of the light adjustment unit 14 is set to a low value and the light intensity of the inspection light Cd is small, the control unit amplifies the detection signal input from the light detection unit 16 to the control unit 20 as appropriate. This can increase the signal intensity and detect the light intensity accurately even when the light intensity of the inspection light Cd is small.

In step S6, the control unit 20 determines whether all voltage levels of the color light beams R, G, and B have been obtained. When the control unit 20 determines that all voltage levels of the color light beams R, G, and B have not been obtained (NO in step S6), the processing returns to step S1 to perform detection for the light source 11 of a different color light beam. In contrast, when the control unit 20 determines that all voltage levels of the color light beams R, G, and B have been obtained (YES in step S6), the control unit 20 proceeds to step S7 and corrects the light source driving data of the light sources 11a, 11b, and 11c so that the image M suitable for the external illuminance can be displayed at a desired brightness and a desired white balance. Specifically, for example, the control unit 20 corrects the light source control data corresponding to the highest tone in the light source driving data so that the highest tone equals a desired light intensity, based on the detection signal of the inspection light Cd having the highest tone. Then, the control unit 20 also corrects the light source control data corresponding to another tone based on the amount of correction of the light source control data at the highest tone. This generates new light source driving data. A switchover between new light source driving data and old light source driving data is preferably made at the timing at which the scanning position of the scanning unit 102 is present in the continuous non-display areas 103c. In addition, the control unit 20 may detect not only the light intensity of only the inspection light Cd having the highest tone, but also the light intensities of the inspection light Cd having a plurality of tones other than the highest tone and may generate new light source driving data based on the detection signals of the plurality of the inspection light Cd in the light sources 11a, 11b, and 11c. The cycle in which all voltage levels of the color light beams R, G, and B are obtained and then the light source driving data of the light sources 11a, 11b, and 11c is corrected is referred to below as cycle Q.

Although the obtainment of the voltage level based on the light intensity in steps S3 to S5 can be performed for a plurality of colors in one of the frames F, the obtainment is preferably performed for each color. The reason will be described specifically with reference to FIG. 10. The voltage level based on the light intensity of the inspection light Cd of the blue laser light beam B is obtained in a frame F1, the voltage level based on the light intensity of the inspection light Cd of the blue laser light beam B is obtained in a frame F2, and the voltage level based on the light intensity of the inspection light Cd of the red laser light beam R is obtained in a frame F3. This can make the certain period U for which the inspection light Cd of one color is emitted long, so the light intensity can be detected more accurately.

"Display processing" has been described above. The following describes "light adjustment processing" for displaying the image M on the display surface (screen 30) at appropriate brightness, which is performed concurrently with the display processing by the image generation unit 100 according to the embodiment, and "reverse processing" for preventing burn-in of the light adjustment unit 14 with reference to FIGS. 8 and 9.

(Light Adjustment Processing)

Light adjustment processing suppresses the attenuation of light by the light adjustment unit 14 so as to increase the brightness of the image M in a bright (external illuminance is large) environment and attenuates light by the light adjustment unit 14 so as to reduce the brightness of the image M in a dark (external illuminance is small) environment, based on, for example, external illuminance from the external light sensor 500. Light adjustment processing is started periodically, for example, at intervals of a certain number of the frames F or a certain period of time.

In step S11, the processing unit 21 receives information about external illuminance from the external light sensor 500 via the input unit 23.

In step S12, the processing unit 21 reads table data, stored in the storage unit 22, that indicates the correspondence between the external illuminance and the light adjustment values and determines the light adjustment value corresponding to the external illuminance input in step S11. It should be noted that the processing unit 21 may obtain the light adjustment value corresponding to the external illuminance via computation.

In step S13, the processing unit 21 determines whether the scanning position of the scanning unit 102 meets a predetermined light adjustment value change timing. Specifically, the light adjustment value change timing is desirably, for example, the timing at which the cycle Q of the light intensity correct processing is not in progress and the scanning position of the scanning unit 102 is present in the continuous non-display areas 103c.

When the light adjustment value change timing is met (Yes in step S13), the processing unit 21 proceeds to step S14 and changes the light adjustment value of the light adjustment unit 14. This adjusts the brightness of the image M displayed on the screen 30.

The light adjustment processing described above may start when the user applies a change operation to the light adjustment value using an operation unit (not illustrated). In this case, the processing unit 21 receives an operation signal from the operation unit (not illustrated) in step S11 described above and determines the light adjustment value based on the operation signal in step S12.

(Reverse Processing)

In reverse processing, the positive electrode and the negative electrode having the same voltage are applied for the same application period to prevent burn-in of the liquid crystal element in the light adjustment unit 14. Specifically, for example, the processing unit 21 sets the ratio of the period for which the liquid crystal element is driven by the positive electrode and the ratio of the period for which the liquid crystal element is driven by the negative electrode to 50% in one frame and a switchover between the positive electrode and the negative electrode is made at half of the frame F.

In step S21, the processing unit 21 determines whether the timing of a switchover between the positive electrode and the negative electrode of the applied voltage of the liquid crystal element of the light adjustment unit 14 is met. Specifically, the processing unit 21 determines whether the timing substantially half of the frame F is met. When the timing substantially half of the frame F is met (Yes in step S21), the processing unit 21 causes the applied voltage of the liquid crystal element of the light adjustment unit 14 to be reversed from the positive electrode to the negative electrode (step S22) and causes the applied voltage of the liquid crystal element of the light adjustment unit 14 to be reversed from the negative electrode to the positive electrode (step S22) at the timing (Yes in step S21) at which a switchover to the next frame is made. Since there are one period for which the liquid crystal element of the light adjustment unit 14 is driven by the positive electrode and one period for which the liquid crystal element of the light adjustment unit 14 is driven by the negative electrode in the frame F and the ratios of both periods are the same, burn-in of the liquid crystal element can be prevented.

Figure 10:
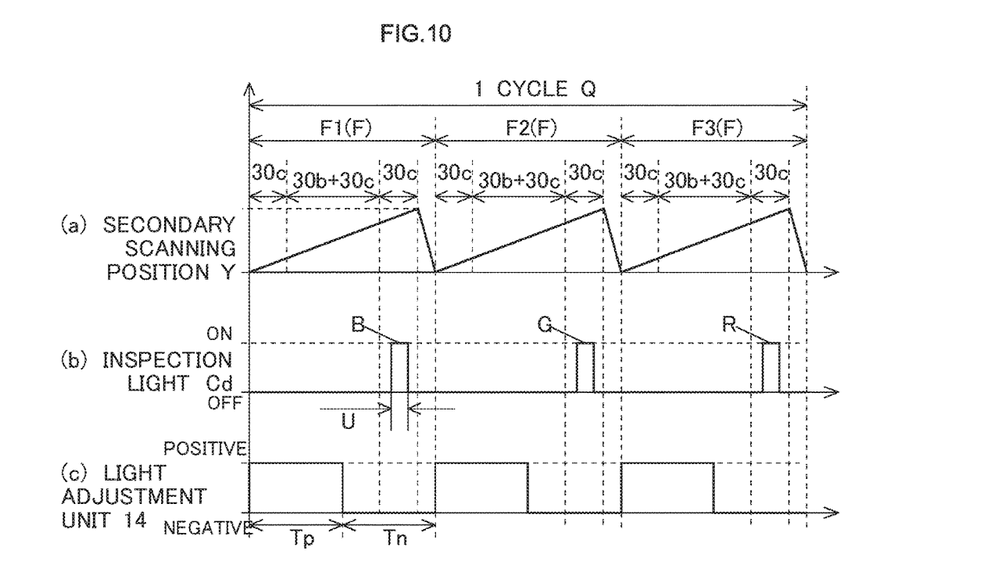
FIG. 10 is an example of a timing chart illustrating the operation of individual units of the image generation device according to the embodiment.

In addition, since the processing unit 21 performs two (even number of times) switchovers between the positive electrode and the negative electrode for each of the frames F, the timing of the positive electrode and the negative electrode in the frame F can be kept constant for all of the frames F. That is, by making the timing of emitting the inspection light Cd in the "light intensity correct processing" constant with respect to the frame F, the inspection light Cd is emitted at the timing at which the liquid crystal element is driven by the negative electrode in all of the frames F (F1, F2, and F3 in FIG. 10), as illustrated in FIG. 10. That is, since the processing unit 21 performs two (even number of times) switchovers between the positive electrode and the negative electrode for each of the frames F, it is possible to keep the timing of the positive electrode and the negative electrode in the frame F constant, make the electrode of the liquid crystal element at the timing at which the inspection light Cd is emitted and detected constant, prevent occurrence of error in the detection of the light intensity due to a difference (difference in the detection condition) in the polarity of the liquid crystal element, thereby enabling accurate detection of the light intensity.

It should be noted that the processing unit 21 may perform a more even number (four or six) of switchovers between the positive electrode and the negative electrode of the liquid crystal element in one frame period F. It should be noted that the processing unit 21 preferably sets the period T of the positive electrode or the negative electrode to a larger value than the period U for which the inspection light Cd is output and this prevents a switchover between the positive electrode or the negative electrode of the liquid crystal element from occurring in the period U for which the inspection light Cd is emitted, as illustrated in FIG. 10.

Figure 11:
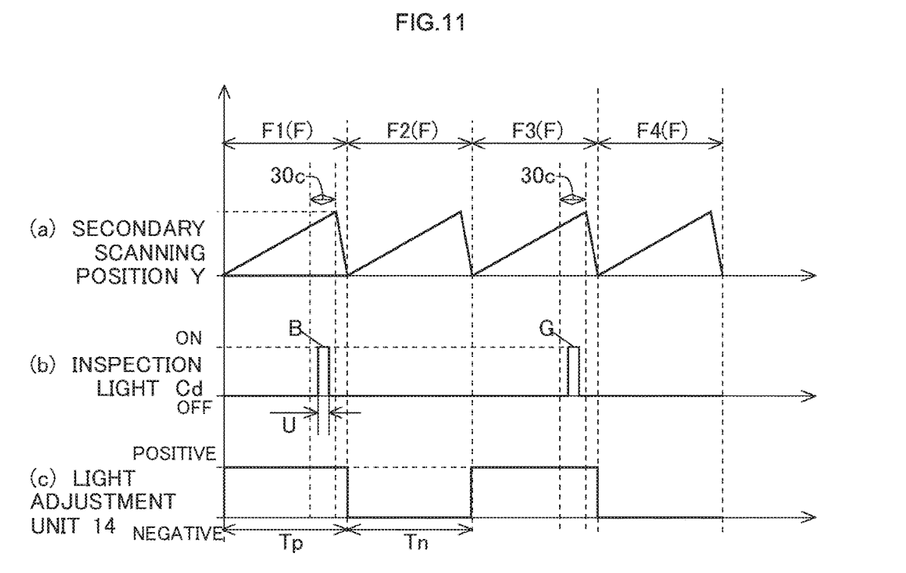
FIG. 11 is an example of a timing chart illustrating the operation of individual units of an image generation device according to a modified embodiment of the invention.

In addition, in one frame period F, the period Tp for which the positive electrode is applied does not necessarily have to equal the period Tn for which the negative electrode is applied. For example, as illustrated in FIG. 11, the light adjustment unit 14 is driven by the positive electrode in a first frame period F1 (third frame period F3) and the light adjustment unit 14 is driven by the negative electrode in a second frame period F2 (fourth frame period F4). Accordingly, the period Tp for which the positive electrode is applied does not equal the period Tn for which the negative electrode is applied in one frame period F. However, in two frame periods F1+F2 (F3+F4), the period Tp for which the positive electrode is applied equals the period Tn for which the negative electrode is applied. Since the period Tp for which the positive electrode is applied equals the period Tn for which the negative electrode is applied in a predetermined period in such a structure, burn-in of the liquid crystal element can be prevented. It should be noted that the predetermined period when the period Tp for which the positive electrode is applied equals the period Tn for which the negative electrode is applied is preferably 1/30 seconds or less.

Figure 12:
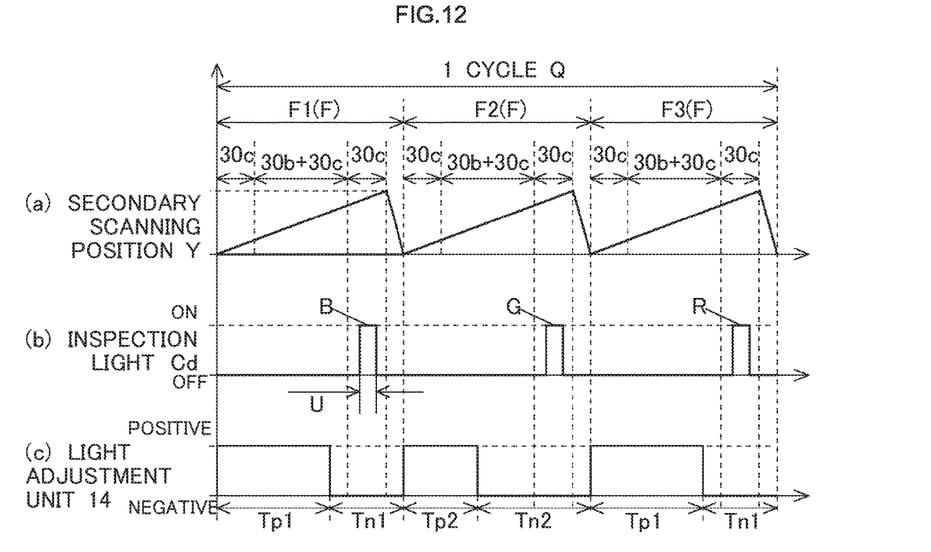
FIG. 12 is a modification of a timing chart illustrating the operation of individual units of an image generation device according to a modified embodiment of the invention.

In addition, the processing unit 21 may make the timing of a switchover between the positive electrode and the negative electrode in the frame period F different between subsequent frames. Specifically, for example, as illustrated in FIG. 12, the period Tp1 for which the positive electrode is applied is 60% and the period Tn1 for which the negative electrode is applied is 40% in the first frame period F1 and the period Tp2 for which the positive electrode is applied is 40% and the period Tn2 for which the negative electrode is applied is 60% in the second frame period F2. Accordingly, although the period Tp for which the positive electrode is applied does not equal the period Tn for which the negative electrode is applied in one frame period F, the period Tp (Tpa+Tp2) for which the positive electrode is applied equals the period Tn (Tn1+Tn2) for which the negative electrode is applied in two frame periods F1+F2. Since the period Tp for which the positive electrode is applied equals the period Tn for which the negative electrode is applied in a predetermined period in such a structure, burn-in of the liquid crystal element can be prevented. In addition, by make the timing of a switchover between the positive electrode and the negative electrode in the frame period F different between subsequent frames, it is possible to prevent the part of the image M close to a predetermined pixel from blurring due to a switchover between the positive electrode and the negative electrode of the liquid crystal element.

According to the embodiment described above, the following effects can be obtained.

An image generation unit (image generation device) 100 according to the embodiment includes the plurality of light sources 11a, 11b, and 11c capable of emitting laser light beams of different colors, the light adjustment unit 14 having the liquid crystal element 14a receiving the laser light beams C from the light sources 11a, 11b, and 11c and adjusting polarization angles of the laser light beams C, the light adjustment unit 14 adjusting the laser light beams C toward an emission direction by adjusting the polarization angles of the laser light beams C, the light adjustment control unit (the control unit 20) for adjusting the laser light beams C toward the emission direction by controlling the liquid crystal element 14a, the light adjustment control unit reversing a voltage applied to the liquid crystal element 14a to a positive electrode or a negative electrode, the scanning unit 102 for generating the image M by scanning the laser light beams C having passed through the light adjustment unit 14 in the secondary scanning direction Y orthogonal to the primary scanning direction X while scanning the laser light beams C a plurality of times in the primary scanning direction X, the light detection unit 16 for detecting the light intensities of the laser light beams C (reflected light beam C1) having passed through the light adjustment unit 14, and the light source correction unit (the control unit 20) for correcting the outputs of the plurality of light sources 11a, 11b, and 11c based on the light intensities of the laser light beams C (reflected light beam C1) detected by the light detection unit 16 at a timing different from a timing at which the voltage applied to the liquid crystal element 14a is reversed by the light adjustment control unit (the control unit 20). As described above, since the control unit 20 does not perform light detection in the time in which the applied voltage of the liquid crystal element 14a is reversed and the light translucent ratio becomes unstable as the light adjustment unit 14, even when reverse processing for preventing burn-in of the liquid crystal element 14a is performed, it is possible to detect the light intensity accurately and cause the light source 11 to emit a laser light beam with a desired light intensity, thereby enabling generation of the image M with good white balance.

In addition, in the image generation unit (image generation device) 100 according to the embodiment, the light source control unit (the control unit 20) sets the timings at which the light intensities of the laser light beams B, G, and R of different colors are detected to the time when the voltage applied to the liquid crystal element 14a is the positive electrode or the time when the voltage applied to the liquid crystal element is the negative electrode. This causes the light intensities of the laser light beams B, G, and R having passed through the liquid crystal element 14a in the same polarity state to be detected, so it is possible to prevent detection error of the light intensity due to the difference in the polarity of the liquid crystal element 14a, thereby enabling more accurate light intensity detection.

In addition, the light adjustment control unit (the control unit 20) drives the liquid crystal element 14a so that the period Tp for which the positive electrode is applied substantially equals the period Tn for which the negative electrode is applied in a predetermined cycle (at intervals of the frame F or a plurality of frames). Since the period Tp for which the positive electrode is applied substantially equals the period Tn for which the negative electrode is applied in the liquid crystal element 14a in this structure, burn-in of the liquid crystal element 14a can be prevented more reliably. That the period Tp substantially equals the period Tn means that the ratio of the period Tp for which the positive electrode is applied to the liquid crystal element 14a to a predetermined cycle is approximately 47% to 53%.

In addition, the light source 11 is capable of emitting inspection light Cd having certain output power for a predetermined period U because it causes the light detection unit 16 to detect the light intensity, and the light adjustment control unit (the control unit 20) makes the period Tp (or Tn) for which the positive electrode or the negative electrode is continuously applied to the liquid crystal element 14a longer than the period U for which the inspection light Cd is emitted. In this structure, it is possible to prevent the polarity of the liquid crystal element 14a from switching for the period U for which the inspection light Cd is emitted, detect the light intensity accurately because light detection is not performed in the time in which the voltage applied to the liquid crystal element 14a is reversed and the light translucent ratio becomes unstable as the light adjustment unit 14, and cause the light source 11 to emit a laser light beam with a desired light intensity, thereby enabling generation of the image M with good white balance.

In addition, the light adjustment control unit (the control unit 20) drives the liquid crystal element 14a so that a period Ta (or Tn) for which the positive electrode or the negative electrode is continuously applied to the liquid crystal element 14a is substantially the same as the frame period F in which the image M is generated. Since this structure prevents a switchover of the liquid crystal element 14a from occurring in one frame period F, the time in which the voltage applied to the liquid crystal element 14a is reversed and the light translucent ratio as the light adjustment unit 14 becomes unstable does not overlap with the period for which the image M is generated in the effective display area 103a, thereby preventing reduction in the display quality of a predetermined pixel in the image M.

In addition, the light adjustment control unit (the control unit 20) drives the liquid crystal element 14a so that the period Tp for which the positive electrode is applied substantially equals the period Tn for which the negative electrode is applied in the period of the frame F in which the image M is generated. Since the period Tp for which the positive electrode is applied and the period Tn for which the negative electrode is applied can be provided in one frame period F in this structure, the light intensities of the laser light beams B, G, and R having passed through the liquid crystal element 14a in the same polarity state can be detected for each frame, even when the light intensities of the laser light beams B, G, and R deviate from desired light intensities, the light intensities of the laser light beams B, G, and R can be immediately corrected to the desired light intensities.

In addition, the light adjustment control unit (the control unit 20) makes the timing of a switchover between the positive electrode and the negative electrode in the frame period F different between the frames F1 and F2 adjacent to each other. Since the timing of a switchover between the positive electrode and the negative electrode in the frame period F is different for each of the frames F in this structure and a switchover of the liquid crystal element 14a is not made in one frame period F, the time in which the voltage applied to the liquid crystal element 14a is reversed and the light translucent ratio as the light adjustment unit 14 becomes unstable is not constant. Accordingly, it is possible to prevent the display quality of a predetermined pixel of the image M from being locally degraded.

In addition, the light source control unit (the control unit 20) obtains the light intensity of one of the laser light beams B, G, and R having up to one color in the frame period F in which the image M is generated. Since this can make the period U for detecting a laser light beam sufficiently longer than the case in which the light intensities of laser light beams having a plurality of colors are detected in the frame period F, the detection accuracy of the light intensity can be improved.

The light intensities of the laser light beams B, G, and R having two or more colors may be detected in the frame period F. Since this can reduce the time required for light intensity correct processing, the outputs of the light sources 11a, 11b, and 11c can be corrected immediately.

In addition, in the HUD 1 according to the embodiment, the light adjustment control unit (the control unit 20) adjusts the laser light beams B, G, and R at a timing excluding the period (period from step S3 to step S7 in FIG. 7 for which the light intensity correct processing is performed) from when the light intensities of the laser light beams B, G, and R are input to when the outputs of the plurality of the light sources 11a, 11b, and 11c are corrected. This can adjust the brightness of the image M (the virtual image V) while maintaining the white balance of the laser light beams B, G, and R.

[Modifications]

The invention is not restricted by the above embodiments and drawings. Changes (including deletion of a component) may be made to the embodiments and drawings as appropriate without departing from the spirit of the invention. Examples of modifications will be described below.

Although the brightness and white balance of the image M are adjusted by correcting the driving of the light sources 11a, 11b, and 11c based on the detection signal from the light detection unit 16 in the above embodiments, the brightness and white balance of the image M may be adjusted by correcting the driving of the light adjustment unit 14 based on the detection signal from the light detection unit 16 and the driving of the light source 11 and the light adjustment unit 14 may be corrected based on the detection signal.

In addition, the light adjustment unit 14 may be provided in the light paths of the laser light beams B, G, and R before being combined instead of in the light path of the combined laser light beam C and this structure enables the laser light beams B, G, and R to be adjusted individually.

In addition, the output timing of the inspection light Cd, the light adjustment value change timing of the light adjustment unit 14, the applied voltage polarity reverse timing of the liquid crystal element 14a, and the like may be determined based on information about the scanning position from the scanning unit 102, may be determined based on a drive signal for driving the light source 11, or may be determined based on vehicle information input from the vehicle 2 or the timing at which the image signal is input.

In addition, although light detection is performed while generating the image M using a translucent film (light branching means) in the above embodiment, the light detection unit 16 may be disposed so as to detect the light intensity of a laser light beam scanned in the non-display areas (103b and 103c) that are regions of the screen 103 in which the observer 3 generally does not recognize visually.

INDUSTRIAL APPLICABILITY

The invention has effects of maintaining good white balance and is useful as an image generation device that generates an image using a laser light source.

REFERENCE SIGNS LIST

1: HUD (head-up display)
2: vehicle
2a: windshield
3: observer
10: laser light source unit
11: light source
14: light adjustment unit
14a: liquid crystal element
16: light detection unit
20: control unit (light adjustment control unit, light source correction unit)
21: processing unit
22: storage unit
23: input unit
100: image generation unit (image generation device)
101: laser light source unit (laser light source device)
102: scanning unit
103: screen
200: first reflection unit
300: second reflection unit
400: cabinet
500: external light sensor
C: combined laser light beam
C1: first reflected light beam
F: frame (frame period)
Fa: actual scanning period
Fb: retrace period
P1: scan start position
P2: display start position
P3: display end position
P4: scan end position
K: display light M: image
Tp: period for which positive electrode is applied
Tn: period for which negative electrode is applied
U: period
V: virtual image

The invention claimed is:

1. An image generation device comprising:
a plurality of light sources that emits laser light beams of different colors;
a liquid crystal element that receives the laser light beams from the plurality of light sources;
a polarizing filter that receives the laser light beams from the liquid crystal element;
a light sensor that detects light intensities of the laser light beams which have passed through the polarizing filter;
a scanner that scans the laser light beams which have passed through the polarizing filter to form an image on a projection surface;
one or more memories that store programs; and
one or more processors that, when executing the programs stored in the one or more memories, perform operations comprising:
adjusting polarization angles of the laser light beams by controlling the liquid crystal element;
reversing a voltage applied to the liquid crystal element to a positive electrode or a negative electrode; and
correcting outputs of the plurality of light sources based on the light intensities of the laser light beams of different colors detected by the light sensor at a timing different from a timing at which the voltage applied to the liquid crystal element is reversed.

2. The image generation device according to claim 1, wherein the operations further comprises:
setting the timing at which the light intensities of the laser light beams of different colors are detected to when the voltage applied to the liquid crystal element is the positive electrode or to when the voltage applied to the liquid crystal element is the negative electrode.

3. The image generation device according to claim 1, wherein the operations further comprises:
driving the liquid crystal element so that a period for which the positive electrode is applied substantially equals a period for which the negative electrode is applied in a predetermine cycle.

4. The image generation device according to claim 1, wherein the plurality of light sources emits inspection light having certain output power for a certain period to cause the light sensor to detect the light intensities, and
wherein the operations further comprises:
making a period for which the positive electrode or the negative electrode is continuously applied to the liquid crystal element longer than the period for which the inspection light is emitted.

5. The image generation device according to claim 1, wherein the operations further comprises:
driving the liquid crystal element so that a period for which the positive electrode or the negative electrode is continuously applied to the liquid crystal element is substantially the same as a period of a frame in which the image is generated.

6. The image generation device according to claim 1, wherein the operations further comprises:
driving the liquid crystal element so that a period for which the positive electrode is applied substantially equals period for which the negative electrode is applied in a period of a frame in which the image is generated.

7. The image generation device according to claim 6 wherein the operations further comprises:
making the timing of a switchover between the positive electrode and the negative electrode in the period of the frame different between the frames adjacent to each other.

8. A head-up display comprising:
the image generation device according to claim 1;
a relay optical system for projecting the image generated by the image generation device to a windshield; and
an external light sensor for detecting external illuminance,
wherein operations further comprises:
adjusting the laser light beams at a timing excluding a period from inputting the light intensities of the laser light beams to correcting output power of the plurality of light sources.

9. The image generation device according to claim 2, wherein the operations further comprises:
driving the liquid crystal element so that a period for which the positive electrode is applied substantially equals a period for which the negative electrode is applied in a predetermine cycle.

10. The image generation device according to claim 2, wherein the plurality of light sources emits inspection light having certain output power for a certain period to cause the light sensor to detect the light intensities, and
wherein the operations further comprises:
making a period for which the positive electrode or the negative electrode is continuously applied to the liquid crystal element longer than the period for which the inspection light is emitted.

11. The image generation device according to claim 3, wherein the plurality of light sources emits inspection light having certain output power for a certain period to cause the light sensor to detect the light intensities, and
wherein the operations further comprises:
making a period for which the positive electrode or the negative electrode is continuously applied to the liquid crystal element longer than the period for which the inspection light is emitted.

12. The image generation device according to claim 2, wherein the operations further comprises:
driving the liquid crystal element so that a period for which the positive electrode or the negative electrode is continuously applied to the liquid crystal element is substantially the same as a period of a frame in which the image is generated.

13. The image generation device according to claim 3, wherein the operations further comprises:
driving the liquid crystal element so that a period for which the positive electrode or the negative electrode is continuously applied to the liquid crystal element is substantially the same as a period of a frame in which the image is generated.

14. The image generation device according to claim 2, wherein the operations further comprises:
driving the liquid crystal element so that a period for which the positive electrode is applied substantially equals a period for which the negative electrode is applied in a period of a frame in which the image is generated.

15. The image generation device according to claim 3, wherein the operations further comprises:

driving the liquid crystal element so that the period for which the positive electrode is applied substantially equals the period for which the negative electrode is applied in a period of a frame in which the image is generated.

16. A head-up display comprising:

the image generation device according to claim 2;

a relay optical system for projecting the image generated by the image generation device to a windshield; and an external light sensor for detecting external illuminance, wherein operations further comprises:

adjusting the laser light beams at a timing excluding a period from inputting the light intensities of the laser light beams to correcting output power of the plurality of light sources.

17. A head-up display comprising:

the image generation device according to claim 3;

a relay optical system for projecting the image generated by the image generation device to a windshield; and an external light sensor for detecting external illuminance, wherein operations further comprises:

adjusting the laser light beams at a timing excluding a period from inputting the light intensities of the laser light beams to correcting output power of the plurality of light sources.

18. A head-up display comprising:

the image generation device according to claim 4;

a relay optical system for projecting the image generated by the image generation device to a windshield; and an external light sensor for detecting external illuminance, wherein operations further comprises:

adjusting the laser light beams at a timing excluding a period from inputting the light intensities of the laser light beams to correcting output power of the plurality of light sources.

19. A head-up display comprising:

the image generation device according to claim 5;

a relay optical system for projecting the image generated by the image generation device to a windshield; and an external light sensor for detecting external illuminance, wherein operations further comprises:

adjusting the laser light beams at a timing excluding a period from inputting the light intensities of the laser light beams to correcting output power of the plurality of light sources.

20. A head-up display comprising:

the image generation device according to claim 6;

a relay optical system for projecting the image generated by the image generation device to a windshield; and an external light sensor for detecting external illuminance, wherein operations further comprises:

adjusting the laser light beams at a timing excluding a period from inputting the light intensities of the laser light beams to correcting output power of the plurality of light sources.

\* \* \* \* \*